Patented May 24, 1927.

1,629,924

UNITED STATES PATENT OFFICE.

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT.

PROCESS FOR MAKING MOLDED RUBBER ARTICLES FROM LATEX.

No Drawing.   Application filed March 24, 1926.   Serial No. 97,023.

This invention relates to a process for making molded rubber articles from latex and the product thereof, more particularly to a process for directly forming the articles by molding from uncoagulated latex, and product.

In recent years the development of direct uses of rubber latex has increased greatly, and such latex is now used to a considerable extent in various operations such as spreading, dipping, and in other forms. However, it has been necessary previously to dry or coagulate the latex before obtaining it in final form, and as far as I am aware, there has been no use of it for directly casting rubber articles while the latex is still fluid and uncoagulated.

An object of my invention is to provide a process for making molded rubber articles in final form directly from latex. Another object is to cast uncoagulated latex. A further object is to provide an improved molded rubber article. Other objects will appear from the detailed description and claims.

Without intention to limit the invention except as required by the prior art, it consists briefly in adding to latex a substance capable of modifying the natural protective colloid to form a gel of the latex, prior to the formation of said gel disposing the latex in the desired form, and drying.

In carrying out the invention either a normal or a concentrated latex may be used, but as the shrinkage to be allowed for will necessarily be greater in the case of a normal latex, it is preferable in most instances to use a concentrated latex containing 50% or more solids. When using a concentrated latex, the latter may be obtained by any of the well known methods for concentrating it. To the latex there is added an agent capable of gelling it by modifying the natural protective colloid. Many materials may be used for this purpose but it is preferred to use a substance such as terpineol or alcohols of the terpene series. In general, higher aromatic hydrocarbons containing the hydroxyl group, of low dissociation values may be used. Examples of these are resorcinol, pyrocatechol, thymol and hydroquinone. Materials containing terpineol may be used, such as pine oil. However, pine oil when used in connection with rubber does not show aging characteristics of the desired nature, and it has been found that pine tar, containing a small amount of pine oil as an impurity may be employed with better results. When using pine tar, it should be a tar which has not been steam distilled at temperature above 150° C. unless a very large amount is used, since owing to the volatility of the terpineol and similar substances when distilled with steam, the resulting product is lacking in the desired gel forming agents.

As an example of the method using pine tar, the following is given:

A water emulsion of the pine tar is first made with any suitable protective colloid. For instance, 100 parts pine tar, 100 parts water, 10 parts glue and 1 part of sodium oleate are emulsified. To form the emulsion the glue and oleate are dissolved in water and then emulsified with the tar. This emulsion will remain stable for practically an indefinite period of time, and it increases in its gelling properties upon keeping. If a normal latex is to be used, containing about 33% solids, from 30 to 40 parts of the pine tar emulsion are added to sufficient latex to form 100 parts of rubber. After adding the pine tar, the latex is stirred until an intimate mixing has been accomplished, and the mixture is then poured into a mold of the desired shape and allowed to stand. With the mixture above given, gelling occurs in approximately from 1 to 2 hours. The molded object may then be either partially dried in the mold or removed therefrom and placed in a position such that it may dry at room temperature or a little above, for instance, from 2 to 15 hours, depending upon the thickness of the object. After this drying at low temperature, the balance of the moisture in the article may be driven off by heating at a higher temperature. If the temperature is elevated too much in the initial stages, blowing of the rubber tends to occur.

If desired, curing ingredients for curing at low or elevated temperatures may also be introduced, and if so, such ingredients are added prior to the addition of the gelling agent. An excellent curing mixture may be obtained by using 3.5 parts sulphur, 5 parts zinc dimethyl dithio carbamate, 1 part zinc oxide and 1 part glue for every hundred parts of rubber. Vulcanized latex may also be used provided that it be of such a character that it is not completely cured before heat is applied to the molded object. Curing agents may also be introduced in the shaped object by diffusion, if desired. Instead of using latex of normal rubber content, a concentrated latex containing 50% or more solids may be used, and for latex containing about 50% solids 20 to 30 parts of the pine tar emulsion per hundred parts rubber are sufficient to cause gelling, the time required being approximately 10 to 30 minutes. In general, the time required for gelling will depend upon various conditions, such as the concentration of the latex and the amount of the emulsion used, an increase in the concentration or an increase in the amount of pine tar or both causing an acceleration in the time required for gelling.

While the invention is of particular value for the casting of articles of practically pure gum, it is also applicable with the use of fillers, and as many as 100 parts of whiting, fuller's earth, etc., can be introduced into the latex and carried through the gelling stage as readily as when no filling material is employed. When using fillers, it is preferable to use a more dilute latex, for instance, one containing from 30 to 35% solids, and the fillers should be added prior to adding the gelling agent or at the same time that curing ingredients are introduced. In addition to fillers other substances, such as coloring matter, may be added.

The process is of particular value in the making of irregularly shaped articles and it is also applicable for the making of many articles composed of relatively pure gum stocks such as tubing, inner tubes, rubber stamps and many other articles. By my process the articles may be formed by casting or molding directly from rubber latex, and prior to the final forming it does not involve any such steps as coagulation, clotting, agglutination, or thickening in the sense this latter term is ordinarily used, the fluid uncoagulated latex being set in the mold merely by the gelling action.

With the above disclosure in mind, it is obvious that modifications will suggest themselves to those skilled in the art, and it is therefore not desired to limit the invention otherwise than as set forth in the appended claims.

Having thus described my invention, what I claim and desire to protect by Letters Patent is:

1. The process of making rubber articles from latex which comprises introducing latex containing a gelling agent into a mold while still in fluid form, gelling, and drying.

2. The process of making rubber articles from latex which comprises forming an object in a mold from uncoagulated latex by gelling and drying the object.

3. The process of making rubber articles from latex which comprises forming an object in a mold from uncoagulated latex containing a gelling agent and a curing combination by gelling in the mold, drying at moderate temperature, and curing.

4. The process of making rubber articles from latex which comprises adding to latex a substance capable of modifying its natural protective colloid to form a gel, disposing the latex while still fluid in a mold, and after setting, withdrawing moisture from the object.

5. The process of making rubber articles from latex which comprises adding to latex a higher aromatic hydrocarbon containing a hydroxyl group and capable of modifying the natural protective colloid of the latex to form a gel, disposing the latex while still fluid in a mold, and after setting, withdrawing moisture from the object.

6. The process of making rubber articles from latex which comprises adding to latex a substance capable of modifying its natural protective colloid to form a gel, disposing the latex while still fluid in a mold, after setting partially drying it at moderate temperature, and completing the drying at a higher temperature.

7. The process of making rubber articles from latex which comprises adding to latex a vulcanizing combination and a substance capable of modifying its natural protective colloid to form a gel, disposing the latex while still fluid in a mold, after setting partially drying the object at substantially room temperature, and completing the drying and curing at a higher temperature.

8. The process of forming rubber articles from latex which comprises adding to latex an alcohol of the terpene series, introducing the mix in fluid form into a mold and permitting it to set therein, and drying the object.

9. The process of making rubber articles from latex which comprises adding to latex terpineol, disposing the mix in fluid form in mold and permitting it to set, and drying the object.

10. The process of making rubber articles from latex which comprises adding to latex pine tar containing steam volatile elements, introducing the mix in fluid form into a mold and permitting it to set, partially drying at substantially room temperature, and completing the drying at a higher temperature.

11. The process of making rubber articles from latex which comprises adding to latex curing ingredients and gelling agents comprising higher hydrocarbons containing a hydroxyl group, introducing the mix in fluid form into a mold and permitting it to set, and drying the object.

12. The process of making rubber articles from latex which comprises adding to latex filling and vulcanizing ingredients and a substance comprising a terpene alcohol, introducing the mix in fluid form into a mold and permitting it to set, partially drying at substantially room temperature, and completing the drying and curing at a higher temperature.

13. The process of making rubber articles from latex which comprises adding to the latex vulcanizing material and a gelling agent, introducing the mix into a mold and permitting it to set, and subjecting the article to drying and curing treatment.

14. The process of making rubber articles from latex which comprises adding to the latex a gelling agent comprising pine tar, molding the mix in desired shape before setting, and drying after setting.

Signed at New York, in the county of New York, and State of New York, this 19th day of March, 1926.

JOHN McGAVACK.